Figures 1, 2:
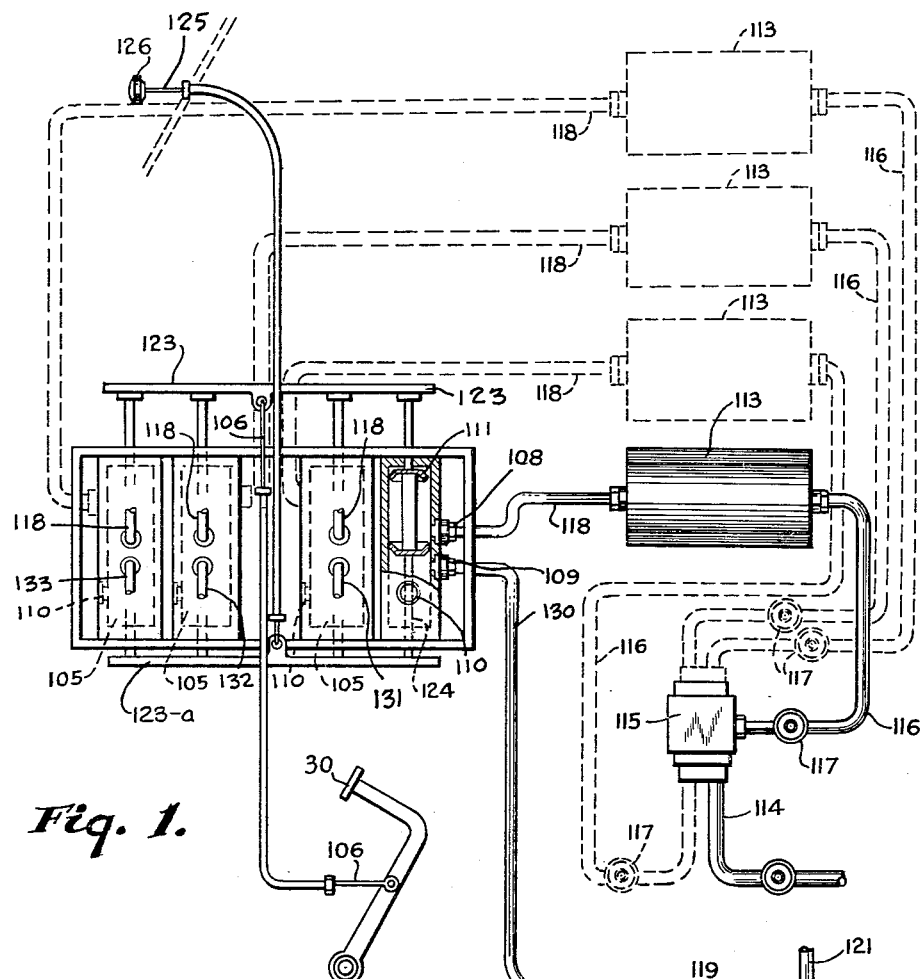

Nov. 28, 1961  A. B. EUGA  3,010,767
BRAKE SYSTEM FOR VEHICLES
Filed June 18, 1958  2 Sheets-Sheet 1

INVENTOR
Arthur B. Euga
Schmieding and Fultz
Attorney

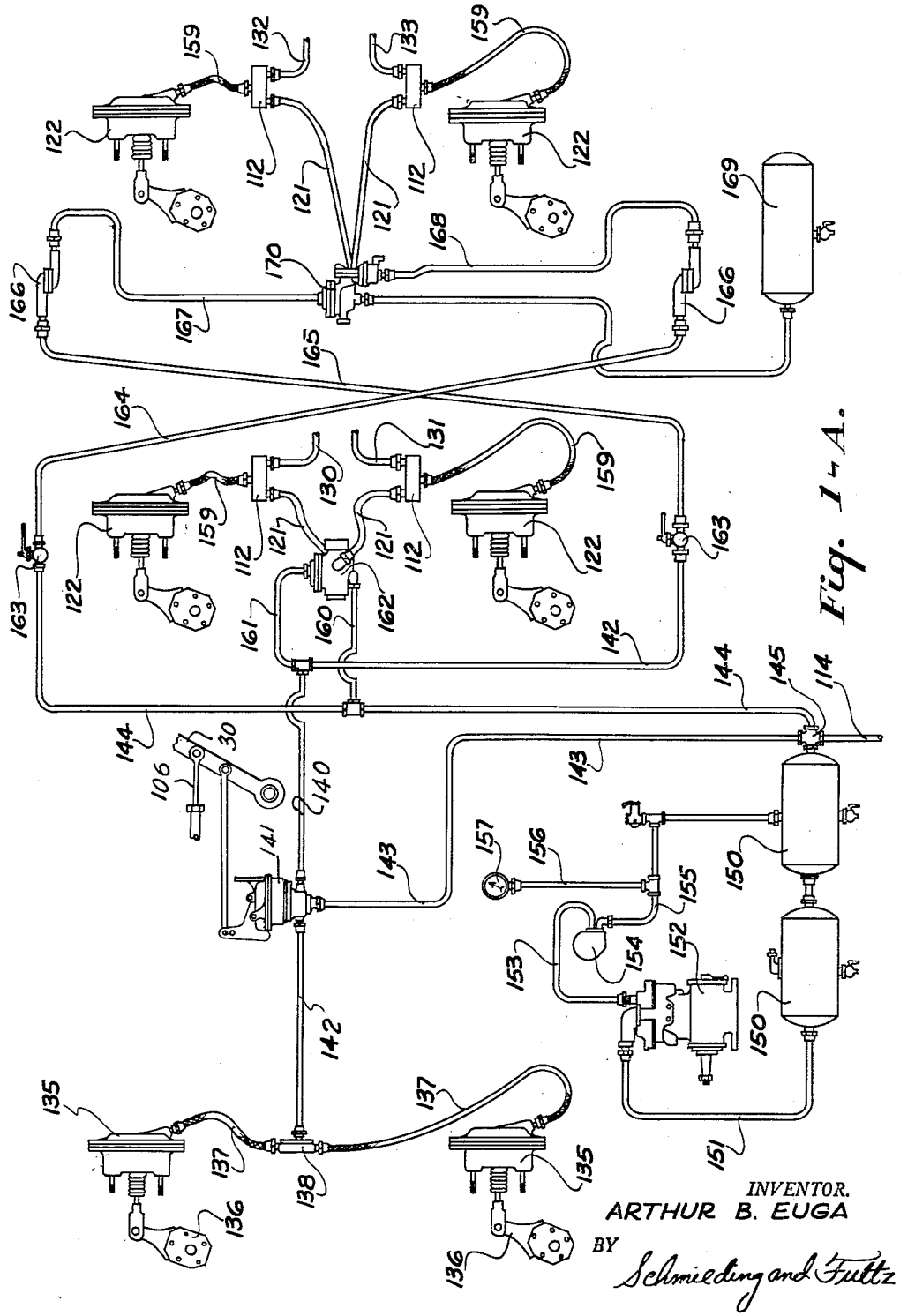

United States Patent Office 3,010,767
Patented Nov. 28, 1961

3,010,767
BRAKE SYSTEM FOR VEHICLES
Arthur B. Euga, 728½ Franklin Ave., Columbus, Ohio
Filed June 18, 1958, Ser. No. 744,038
12 Claims. (Cl. 303—2)

This invention relates to improvements in braking systems for motor vehicles and more particularly to auxiliary braking systems which are actuable upon failure of the usual service braking means.

This application is a continuation-in-part of my co-pending application Serial Number 564,314 filed February 8, 1956, now abandoned, which is a continuation-in-part of co-pending application Serial Number 176,785 filed July 31, 1950, now abandoned.

Modern vehicles are equipped with a fluid actuated service braking system and a so-called parking or emergency braking system. Such a service system, unfortunately, is subject to complete failure upon loss of its operating fluid, as of a broken line or connection in a necessarily closed and sealed system.

One object of the invention, therefore, is the provision of a means for instantly actuating the emergency braking means upon failure of the service braking means, without any action additional to that required in operating the service braking means.

Another object of the invention, therefore, is the provision of a novel means adaptable for instantly supplementing the fluid action of the service braking means upon partial loss of the serving fluid therefor without any action additional to that required in operating the service braking means.

Further objects and advantages of the present invention will be apparent from the following description, reference being had to the accompanying drawings wherein preferred forms of embodiments of the invention are clearly shown.

In the drawings:

FIGURE 1 is a diagrammatic view of an auxiliary fluid circuit portion of a brake system constructed according to the present invention and adapted for use with compressed air;

FIGURE 1–A is a diagrammatic view of a service fluid circuit portion of a brake system constructed according to the present invention and adapted for use with compressed air;

FIGURE 2 is a sectional elevation of a modification of the line transfer sleeve or valve means used with the auxiliary brake system of the present invention shown in FIGURE 1, said section being taken along a vertical plane through the center line of said transfer sleeve.

Referring to the drawing FIGURE 1 illustrates an auxiliary fluid supply means which is applied to a conventional air brake system for actuation of conventional service air brake cylinders 122. The conventional portions of the service brake fluid system are illustrated in FIGURE 1–A and include a compressor 152 which supplies air through line 151 to service reservoirs 150. Air from service reservoirs 150 is supplied to fluid motors for the tractor of the vehicle via lines 144, 160, relay valve 162, lines 121, controllers 112, and lines 159 which connect controllers 112 with fluid motors 122 for the rear axle of the tractor of the vehicle.

It will be noted that a transfer sleeve or valve means 112, fluid motor 122, and the lines associated therewith are illustrated in both the auxiliary fluid supply means of FIGURE 1 and the service fluid supply means of FIGURE 1–A, and these two figures should be considered together as forming a combined service and auxiliary system.

Brake valve 141, FIGURE 1–A, is of the conventional type well known to those skilled in the art. Brake valve 141 is actuated by pedal lever 30 and communicate with service reservoir 150 via line 143 and also with relay valve 162 via lines 142 and 161. Relay valve 162 is of the conventional type well known to those skilled in the art, and serves as a flow controller between service reservoirs 150 and fluid motor 122. The rate of fluid discharge of relay valve 162 is varied responsive to variations in the pressure imposed on a pressure responsive flow control element therein, and the pressure responsive element in relay valve 162 is subjected to variations in the pressures produced by actuation of brake valve 141.

With continued reference to FIGURE 1–A, service reservoirs 150 supply air to trailer reservoir 169 mounted on the trailer of the vehicle, via line 144. Shut-off valve 163, line 164, disconnect coupling 166, line 168, and relay emergency valve 170. Trailer reservoir 169 supplies air to trailer fluid motors 122 via relay emergency valve 170, lines 121, valve means 112 and lines 159 to trailer fluid motors 122. Relay emergency valve 170 for the trailer communicates with and is controlled by brake valve 141 via lines 142, shut-off valve 163, line 165, disconnect coupling 166, and line 167. Relay emergency valve 170 is of a conventional type well known to those skilled in the art and serves as a pressure actuated means for controlling the main flow of air from trailer reservoir 169 to trailer fluid motor 122.

The system of FIGURE 1–A further includes a pair of fluid motors 135 for applying braking action to the front wheels of the tractor. Such fluid motors 135 actuate conventional slack adjusters 136 which operate the frictional braking mechanism of the vehicle. Front wheel fluid motors 135 are controlled by brake valve 141 and receive air from service reservoirs 150 via line 143, brake valve 141, line 140, T-connection 138, and lines 137. The delivery of air from compressor 152 to service reservoirs 150 is controlled in a conventional manner well known to the art by a governor 154 which connects with compressor 152 via line 153, and with reservoirs 150 via line 155. A gauge 157, which is mounted on the dashboard of the vehicle, is exposed to the fluid pressure in main reservoir 150 via lines 155 and 156.

As seen in FIGURE 1–A, a line 114 receive air from service reservoirs 150, and as is seen in FIGURE 1, such line 114 supplies air to each of the auxiliary reservoirs 113 of the auxiliary control system of FIGURE 1.

The auxiliary control system illustrated in FIGURE 1 includes a plurality of control means 105, each of which is arranged to release air from one of the auxiliary reservoirs 113 to a respective fluid motor 122 upon actuation of lever 30 to a position beyond that normally required to actuate the conventional service brake system. Lines 130, 131, 132, and 133 each lead from a respective one of the separate control means 105 and connect a respective one of the auxiliary reservoirs 113 with a respective one of the transfer sleeves or valve means 112, which are, in turn, connectable with a respective one of the four fluid motors 122, as is seen in FIGURE 1–A.

The air control means 105 is connected to the conventional service brake foot lever 30 by a sheathed cable 106 leading to an arm 123 which is in turn connected to member 124 of air control means 105.

The air control means 105 can also be actuated by hand by pushing a handle 126 secured to sheathed cable 125. Cable 125 leads to a lower arm 123–a which is in turn connected to the lower end of member 124 of air control means 105.

Air control means 105 may be of any suitable construction, but, in the form shown, is a cylinder closed by plugs at both ends, said cylinder having radial side inlet and outlet 108 and 109 near one end, a medial side outlet 110, open to the atmosphere and a pressure sealed piston 111 slidably mounted therein in such a manner that the inlet 108 is effectively cut off from the outlet 109. Separate air control means 105, line transfer sleeves or valve means 112, and compressed air tanks 113 are provided for each wheel air brake motor, the pistons of the air control valve means 105 all being ganged together for operation as one. For reasons of clarity that part of the system applicable to only one wheel brake is hereinafter described.

With continued reference to FIGURE 1, a pressure line 114 of the auxiliary fluid supply means receives pressurized air from a source such as air compressor 152, FIGURE 1-A, and a pressure regulator 115, the latter being in communication with a pressure tank 113 through a line 116 having a check valve 117. A pressure line 118 extends from reservoir 113 to the side inlet 108 of the air control means 105 having a side outlet 109 in communication with a terminal side inlet 119 of the line transfer sleeve or valve means 112. The opposite terminal side inlet 120 of the latter is in communication with the regular service air line 121 which receives air from the service air source controlled by pedal 30 while the medial side outlet thereof is in communication with the wheel air brake fluid motor 122.

A modification of line transfer sleeve or valve means 112 is illustrated at 65 in FIGURE 2. In this modification the left and right and ports 85 are connected to outlet 109 of air control means 105 and service brake line 121, respectively. The central outlet port of line transfer sleeve or valve means 65 is connected to air brake cylinder 122. The piston 89 is provided with oppositely facing cup shaped seals and may be removed from the cylinder at the threaded plugs 84. Operation of these line transfer sleeves, such as 65, is set forth in my co-pending application Serial Number 564,321 filed February 8, 1956.

The lower control cable 106 for air control means 105 is secured to the piston ganging member 123 which is shown as a bar in such a manner that a downward and continued movement of the pedal 30 will cause the piston 111 to move downwardly in the cylinder and thereby couple inlet 108 and outlet 109 of the air control means 105.

The piston 111 is provided with an extending portion 124 to which is affixed a resetting cable 125, said cable extending to a terminally attached button 126 mounted above the dash structure of the vehicle. It will be understood from considering FIGURE 1 that after the auxiliary fluid supply means has been actuated, the system will remain pressurized with the fluid motors 122 maintaining braking action at the wheels of the vehicle. Hence, to release the auxiliary brake, resetting cable 125 is pulled to raise piston 111 of air control means 105 upwardly whereby the pressurized fluid is released from fluid motor 122 via line 130 and side vent 110 of air control means 105.

As previously mentioned, cable 125 also serves as a means for manually actuating air control means 105.

In operation of the auxiliary system of FIGURE 1, when the inlet 108 and outlet 109 of the air control means 105 are coupled together by downward movement of the piston 111, air under pressure is free to flow from the tank 113 through the air control means 105 to the transfer sleeve or valve means 112. If the regular air brakes are adequately served with operating fluid no further action can occur since the force tending to displace the piston within the line transfer sleeve or valve means 112 is countered by the force imparted through service line 121. When the service line 121 is deficient in fluid pressure, however, the piston in the transfer sleeve or valve means 112 is displaced and the wheel air brake motor 122 effectively transferred to the auxiliary line. Thus the brakes are automatically actuated even though the regular service lines have failed. It will be understood that during normal operation of the service fluid supply means of FIGURE 1-A, a predetermined pressure differential is maintained by pressure regulator 115, FIGURE 1, between the pressure of the fluid in the service fluid supply and the pressure of the fluid in the auxiliary fluid supply whereby the movable element or piston in transfer sleeve or valve means 112 is normally biased to maintain it in a left position, illustrated in FIGURE 1. Hence, the left inlet port 119 of transfer sleeve or valve means 112 is normally isolated from the inlet port of fluid motor 122. Upon occurrence, however, of a decrease in the pressure of the fluid in the service fluid supply, in an amount greater than said predetermined pressure differential, the piston or movable element in transfer sleeve or valve means 112 is shifted to the right, FIGURE 1, and fluid motor 122 is instantly simultaneously placed in communication with the auxiliary fluid supply means and isolated from the service fluid supply means.

The system of the present invention can also be operated with an auxiliary fluid pressure in auxiliary reservoirs 113 equal to or greater than the fluid pressure in service reservoirs 150. In such instance the above-mentioned predetermined pressure differential will not be present for the purpose of biasing the movable element or piston in transfer sleeve or valve means 112 to the left and it is hence necessary to normally isolate the left side of the piston or movable element, FIGURE 1, from the pressure of the auxiliary fluid system during the normal operation of the service fluid supply means. Such isolation, during normal operation of the service system, is effected by air control means 105 which serves not only as a shut-off valve between the auxiliary fluid supply and the left side, FIGURE 1, of the movable element in transfer sleeve or valve means 112, but also serves as means for normally venting the left side of said movable element to the environment via vent opening 110 that normally communicates with line 130 via outlet 109 of air control means 105. Upon failure of the service fluid system, however, and actuation of lever 30 to a position beyond that normally required to actuate the service brake system, inlet 108 and outlet 109 of air control means 105 are connected whereby pressurized auxiliary fluid is released to transfer sleeve or valve means 112. The piston or movable element therein is shifted to the right, FIGURE 1, whereby the pressurized auxiliary fluid enters fluid motor 122 and actuates same. After an auxiliary operation of fluid motor 122 the piston 111 in air control means 105 is raised by pulling upper cable 125 whereby fluid motor 122 is vented to the environment via valve means 112, line 130, outlet 109 and vent 110.

It will be understood that since a separate transfer sleeve or valve means 112 is utilized at each of the fluid motors 122, and since a separate air reservoir 113 and air control means 105 is provided for each of the fluid motors, the system provides, in effect, a separate auxiliary brake system for each of the fluid motors.

While the forms of embodiments of the present invention as herein disclosed constitute preferred forms, it is to be understood that other forms might be adopted, all coming within the scope of the claims which follow.

I claim:

1. A braking system for a vehicle comprising, in combination, a fluid motor for actuating a braking means at a wheel of said vehicle; valve means communicating with said motor; service fluid supply means for said valve means; auxiliary fluid supply means for said valve means at a pressure value less than the pressure of said service fluid to provide a predetermined pressure differential, said valve means being such that said auxiliary fluid is excluded from and said service fluid is admitted to said motor during the existence of said predetermined pressure differential, and such that said auxiliary fluid is admitted and said service fluid is excluded from said motor when said predetermined pressure differential is a lesser value; means forming a common source of pressurized fluid for said service fluid supply means and said auxiliary fluid supply means; a pressure regulator connected between said source and said auxiliary fluid supply for providing said predetermined pressure differential; and a check valve between said auxiliary fluid supply means and said source.

2. A braking system for a vehicle comprising, in combination, a plurality of fluid motors, each of said fluid motors being located at a respective wheel of said vehicle; a plurality of valve means, each of said valve means being in communication with a respective fluid motor; service fluid supply means for said valve means; auxiliary fluid supply means for said valve means at a pressure value less than the pressure of said service fluid to provide a predetermined pressure differential, said valve means being such that said auxiliary fluid is excluded from and said service fluid is admitted to said motors during the existence of said predetermined pressure differential, and such that said auxiliary fluid is admitted and said service fluid is excluded from said motor when said predetermined pressure differential is a lesser value; said auxiliary fluid supply means including a plurality of separate reservoirs each of which is connectable with a respective one of said fluid motors; means forming a common source of pressurized fluid for said reservoirs; a pressure regulator connected between said source and said plurality of separate reservoirs; a plurality of check valves, each of said check valves being located between a respective one of said separate reservoirs and said source.

3. The apparatus defined in claim 1 wherein said valve means is located adjacent said fluid motor.

4. The apparatus defined in claim 2 wherein each of said valve means is located adjacent a respective fluid motor.

5. The apparatus defined in claim 1 which includes auxiliary fluid control means for venting pressure from said fluid motor at will when said valve means is in the position which admitted said auxiliary fluid to said fluid motor.

6. The apparatus defined in claim 2 which includes auxiliary fluid control means for venting pressure from said fluid motor at will when said valve means is in the position which admitted said auxiliary fluid to said fluid motor.

7. The apparatus defined in claim 1 which includes an auxiliary fluid control means having a first position wherein said valve means is isolated from said auxiliary fluid supply means and said auxiliary fluid is vented from said motor, and a second position wherein said valve means is connected with said auxiliary fluid supply means and no auxiliary fluid is vented from said motor.

8. The apparatus defined in claim 2 which includes an auxiliary fluid control means having a first position wherein said valve means are isolated from said auxiliary fluid supply means and said auxiliary fluid is vented from said motors, and a second position wherein said valve means are connected with said auxiliary fluid supply means and no auxiliary fluid is vented from said motors.

9. A braking system for a vehicle comprising, in combination, a fluid motor for actuating a braking means at a wheel of said vehicle; valve means; means including a service brake valve for supplying service fluid to said valve means; a manual operator for said service brake valve; means for supplying auxiliary fluid to said valve means; said valve means including a first position wherein said service fluid is admitted to and said auxiliary fluid is excluded from said motor, and a second position wherein said auxiliary fluid is admitted to and said service fluid is excluded from said motor; and an auxiliary fluid flow regulating means for connecting said valve means to said auxiliary fluid supply means for regulation of the supply of auxiliary fluid to said valve means; means connecting said manual operator to said auxiliary fluid flow regulating means for regulating the supply of auxiliary fluid to said valve means.

10. The apparatus defined in claim 9 wherein a plurality of said fluid motors are each located at a respective wheel of said vehicle, wherein said auxiliary fluid supply means includes a plurality of separate reservoirs which receive pressurized fluid from a common source, and wherein said plurality of fluid motors are each connectable with a respective separate reservoir.

11. The apparatus defined in claim 9 wherein a plurality of said fluid motors are each located at a respective wheel of said vehicle, wherein said auxiliary fluid supply means includes a plurality of separate reservoirs which receive pressurized fluid from a common source, wherein said plurality of fluid motors are each connectable with a respective separate reservoir, and wherein a check valve is included between said source and each of said plurality of separate reservoirs.

12. The apparatus defined in claim 9 wherein said flow regulating means includes means for venting, at will, auxiliary fluid from said valve means.

References Cited in the file of this patent

UNITED STATES PATENTS

| | | |
|---|---|---|
| 486,703 | Duval | Nov. 22, 1892 |
| 1,549,772 | Hukill | Aug. 18, 1925 |
| 2,037,055 | Wills et al. | Apr. 14, 1936 |
| 2,266,264 | Reid | Dec. 16, 1941 |
| 2,300,694 | Overbeke | Nov. 3, 1942 |
| 2,304,546 | Cox | Dec. 8, 1942 |
| 2,365,557 | Keith | Dec. 19, 1944 |
| 2,394,343 | Vorech | Feb. 5, 1946 |
| 2,451,139 | Williams et al. | Oct. 12, 1948 |
| 2,464,469 | Tremolda | Mar. 15, 1949 |
| 2,544,997 | Keim et al. | Mar. 13, 1951 |
| 2,649,169 | Holman | Aug. 18, 1953 |